United States Patent [19]
Iseler et al.

[11] Patent Number: 4,535,110
[45] Date of Patent: Aug. 13, 1985

[54] DUAL FUNCTIONAL ADDITIVE

[75] Inventors: Kenneth A. Iseler, Richmond; Probir K. Guha, Mt. Clemens; Robert C. Yen, Troy, all of Mich.

[73] Assignee: The Budd Company, Troy, Mich.

[21] Appl. No.: 624,458

[22] Filed: Jun. 25, 1984

[51] Int. Cl.$^3$ .............................................. C08K 3/22
[52] U.S. Cl. ................................... 524/196; 252/182; 524/433; 524/539; 524/590; 525/28; 528/76; 528/83; 528/65
[58] Field of Search ............... 524/590, 539, 196, 433; 252/182; 525/28; 528/76, 83, 65

[56] References Cited
U.S. PATENT DOCUMENTS

| | | | |
|---|---|---|---|
| 4,067,845 | 1/1978 | Epel et al. | 525/19 |
| 4,424,333 | 1/1984 | O'Connor | 528/75 |
| 4,439,577 | 3/1984 | O'Connor et al. | 524/425 |

FOREIGN PATENT DOCUMENTS 2045259 10/1980 United Kingdom .

OTHER PUBLICATIONS

Chem. Abstr., vol. 98, 199315h, 1983, (Abstract of EP74,746).

Primary Examiner—Maurice J. Welsh
Attorney, Agent, or Firm—Fisher, Crampton, Groh & McGuire

[57] ABSTRACT

An isocyanate terminated urethane prepolymer composition having an equivalent ratio of NCO to OH from about 1.2/1 to about 5/1. The isocyanate terminated urethane prepolymer acts as dual functional additive and is prepared by reacting one equivalent weight of a polyol having an average molecular weight of about 600 to about 4,000 and an average functionality of about 2 to about 6 and preferably 2 to 3 and most preferably 2 and 1.2 to 5 equivalents of polyisocyanate and preferably two equivalent weights of polyisocyanate, and preferably a diisocyanate, whereby the reactants combine in a one-step addition process to yield an isocyanate terminated urethane prepolymer of controlled molecular weight to impart improved low shrink, dynamic impact, molding characteristics as measured by viscosity index properties in thermoset polyester resin products, and particularly sheet molding compositions (SMC) by covalently bonding to the polyester resin matrix of the SMC.

6 Claims, No Drawings

DUAL FUNCTIONAL ADDITIVE

The present invention relates to the development of a dual functional additive system for thermoset polyester resins which imparts improved glass read out, enhanced pigmentability and superior low shrink properties over the known prior art, thereby producing an overall improved Class A quality surface finish for thermoset polyester resin products. Further, the dual functional additive of the present invention is compatable with other conventional low shrink additives as may be added to the thermoset polyester resin, and may or may not be used with them, a significant improvement in dynamic impact properties is obtained over that exhibited by any of the known prior art.

The dual functional additive system comprises the dual thickening system comprised of metallic oxides and hydroxides of calcium or magnesium as described in Epel et al, U.S. Pat. No. 4,067,848 and incorporated herein by reference, and an additional isocyanate terminated urethane prepolymer which has an NCO/OH ratio within the range of approximately 1.2/1 to approximately 5/1 and preferably an NCO/OH between 1.8 to 3.

The dual functional additive system provides that the isocyanate terminated urethane prepolymer becomes covalently bonded to the thermoset polyester resin matrix of the polyester resin product. It should be emphasized that, insofar as is known, none of the conventional low shrink additives contained within the prior art covalently bonds with the thermoset polyester resin material. By virtue of being covalently bonded to the thermoset polyester resin, the new additive imparts improved dynamic impact properties to the thermoset polyester resin product.

Finally, this new isocyanate terminated urethane additive, when used in conjunction with the teachings of Epel et al, serves a dual purpose as a low shrink additive to allow greater predictability of so-called "shrinkage" during formation of thermoset polyester resin material products, and aids in the thickening process during maturation.

SUMMARY OF THE INVENTION

Low shrink additives comprised of a polyisocyanate and a polyether polyol for use in thermoset polyester resin products to minimize shrinkage experienced by the thermoset polyester resin product during final cure are old and well known in the prior art.

The present invention relates to the development of a dual functional additive for use in thermoset polyester resin products incorporating the dual thickening system of Epel et al, and comprises an isocyanate terminated urethane prepolymer additive based upon a polyisocyanate and a polyether or polyester polyol, and preferably a polyether polyol, which acts in concert with NCO, etc. to thicken the system and impart improved viscosity index to the polyester matrix as explained in Epel et al's patent, and, at the same time, imparts superior dimensional change predictability to the thermoset polyester resin product during final cure than would otherwise be obtainable by using the dual thickening system of Epel et al.

Further, by virtue of the fact the dual functional additive of the present invention convalently bonds to the thermoset polyester resin, the resulting product possesses improved dynamic impact properties than would otherwise be expected from using any of the conventional low shrink additives of the prior art alone, as well as superior high temperature property retention.

The isocyanate terminated urethane prepolymer of the present invention is made in a one-step process and has an NCO/OH ratio of approximately 1.2/1 to approximately 5/1, and preferably an NCO/OH ratio of 1.8 to 3 and is made by combining one equivalent of a polyol, preferably polyether polyol having a molecular weight of approximately 600 to 4,000 and a functionality of approximately 2 to 6, and preferably 2 to 3, and most preferably 2, with two equivalents of a polyisocyanate and preferably a di-isocyanate and 0 to 1% of any conventional urethane catalyst, such as stannous octoate, dibutyltin dilaurate (and the like), said amount to vary according to the total weight of the urethane. This dual functional additive may or may not be dissolved in an ethylinically unsaturated monomer, such as styrene.

As previously mentioned, this dual functional additive is contemplated for use with the dual thickening system of Epel et al to aid in the thickening process and improve viscosity index, and by virtue of the fact that the additive is isocyanate terminated, covalent bonding to the thermoset polyester resin material is facilitated, thereby enhancing the dynamic impact properties of the thermoset polyester resin material. Finally, the use of this additive allows greater predictability of dimensional changes to be expected from the thermoset polyester product during final cure than is otherwise obtainable, insofar as is known, from any of the conventional low shrink additives of the prior art.

PRIOR ART STATEMENT

Epel et al, U.S. Pat. No. 4,067,845 describes a dual thickening system for use in the production of a moldable thermoset polyester resin composition. The dual thickening system as taught by Epel et al is an oxide or hydroxide of calcium or magnesium, and preferably magnesium, and is used in conjunction with a polyisocyanate to impart improved molding characteristics to the thermoset polyester resin than would otherwise be obtained from using only oxides and/or hydroxides of calcium and magnesium.

Epel et al differs from the present invention by reason that the polyisocyanate specified in Epel et al does not include an isocyanate terminated urethane prepolymer based upon a polyester polyol or a polyether polyol or a mixture thereof and a polyisocyanate. The dual functional additive system of the present invention deletes the organic polyisocyanate of Epel et al, and instead substitutes from the dual thickening system of Epel et al, an isocyanate terminated urethane prepolymer based upon a polyether polyol or a polyester polyol or a mixture thereof, to impart better low shrink predictability than would otherwise be expected from using the system as taught by Epel et al alone, while acting as a thickener for improved molding characteristics. Moreover, the disclosure of Epel et al does not address itself specifically to the problem of predictability of shrinkage to be experienced by the final product discussed in Epel et al.

O'Connor et al, U.K. Pat. No. GB 2045259B discloses a urethane dominated low shrink additive for use in thermoset polyester resin products. The low shrink additive is based upon a polyester or polyether polyol or mixture thereof, and preferably a polyether polyol, a polyisocyanate, and an isocyanate reactive unsaturated monomer, preferably hydroxyalkylacrylate, whereby the OH groups of the monomer react with the NCO groups on the intermediate isocyanate terminated urethane prepolymer thereby "capping off" the NCO and exposing a double bond for later reaction.

The urethane low shrink additive of O'Connor et al is made in a two-step process. Specifically, an isocyanate terminated prepolymer is made based upon either a polyether polyol or a polyester polyol as outlined above, and a polyisocyanate whereby an isocyanate terminated prepolymer is created having a ratio of NCO/OH of approximately 1.02/1 to approximately 1.6/1 and preferably, 1.1/1 to 1.4/1. The isocyanate groups are then reacted with an isocyanate reactive unsaturated monomer selected from among suitable esters, amides or alcohols, and preferably with hydroxyethyl acrylate. This reaction should result in a final free NCO content preferably in the range of 0–1% and most preferably in the range of 0–0.5% of free NCO. The reaction of the isocyanate terminated prepolymer with the unsaturated monomer described above results in a controlled molecular weight oligomer with terminal unsaturation. The additive as described in O'Connor et al is a low shrink additive and does not, in stark contrast to the present invention, take part in the thickening process using the dual thickening system as described in Epel et al.

Moreover, the dual function additive isocyanate terminated urethane polymer of the present invention does not provide terminal unsaturation, as does the low shrink additive of O'Connor et al.

Rather, the dual functional additive of the present invention is terminated by NCO groups which react with the terminal OH groups of a thermoset polyester resin and covalently bond thereto, to provide low shrink advantages and higher impact properties, as will be described herein, and in conjunction with the dual thickening system of Epel et al, act as a thickener for the thermoset polyester resin for improved molding characteristics. The low shrink additive as described in O'Connor et al depends upon reactions with the terminal reactive unsaturation of the prepolymer for its low shrink properties. Further, the present invention provides for an NCO/OH ratio of approximately 1.2/1 to approximately 5/1, and preferably an NCO/OH ratio between 1.8 to 3. Thus, the mechanisms of the reaction of the respective low shrink additives are vastly different.

O'Connor et al, European Patent Application No. 0074746 relates to a thermosetting polyester resin composition which includes a select polyurethane oligomer to improve impact properties and surface characteristics of the thermoset polyester resin composition. These polyester resin systems as embodied in O'Connor et al 0074746 give increased impact properties as well as low shrink characteristics to the polyester resin system.

However, the manner in which these ends are achieved differs from the present invention. Specifically, polyurethane chemical system employed by O'Connor et al is formed by the reaction of a hydroxyl terminated prepolymer with dicarboxylic acid anhydrides. The present invention does not use dicarboxylic acid anhydrides to form the prepolymer of the present invention. Moreover, the NCO/OH ratio of the polyurethane oligomer of O'Conner et al is about 0.3/1 to about 0.99/1 whereas in the present invention, the NCO/OH ratio is from between 1.2/1 to about 5/1 and preferably 1.8/1 to about 3/1. The system as defined by O'Connor et al would give rise to fiber readout problems which are overcome in the present invention.

In addition, O'Connor et al emphasizes the use of chain extenders to lengthen the prepolymer of his invention. The average molecular weight of the polyol used in O'Connor et al is about 300 to about 10,000, which is different than the present invention wherein the range of 600 to 4,000 is preferred. Further, O'Connor et al prefers a polyester polyol whereas in the present invention, polyether polyols are the preferred polyol reactants. In addition, the polyurethane oligomer that is utilized according to the invention in O'Connor et al is a hydroxyl terminated prepolymer whereas in the present invention, the prepolymer is isocyanate terminated. Further, the polyurethane oligomer of O'Connor et al is reacted with a dicarboxylic acid whereas in the present invention, such is not the case.

Finally, the present invention is contemplated for use with the dual thickening system of Epel et al to aid as a thickener as well as a low shrink additive to form a thermoset polyester resin product having good low shrink characteristics and dynamic impact properties, whereas O'Connor et al cannot, because their oligomer does not take part in the O'Connor et al.

O'Connor et al, U.S. Pat. No. 4,424,333 relates to the modified polyurethane liquid polymer composition comprised of a polyurethane oligomer containing terminal ethylenic unsaturation. The polyurethane oligomer contemplated by O'Connor et al is prepared by reacting an organic polyisocyanate and a polyether polyol to form an oligomer and then reacting this product with an isocyanate reactive group containing an unsaturaged monomer selected from appropriate acrylates and acrylomides or mixtures thereof, and preferably hydroxyethylacrylate to produce the terminal unsaturation.

The polyol used should have an average molecular weight of approximately 75 to approximately 500, and preferably 100 to 200, and a functionality of at least 3, and preferably 3–8 and most preferably 4–6. The ratio of NCO/OH in the polyurethane oligomer of O'Connor et al is approximately 0.8/1 to approximately 2/1 and preferably 1/1 to about 1.2/1. It is believed that, aside from the differences in molecular weight and NCO/OH ratios, the polyurethane oligomer of O'Connor et al cannot be used with the dual thickening system of Epel et al.

As previously stated, the present invention is a dual functional additive which aids the dual thickening system of Epel et al and covalently bonds to the thermoset polyester resin of such a product to present predictability of dimensional changes of such a product during final cure such as could not be expected by the use of Epel et al alone. O'Connor et al cannot, because of its ethylenic terminal unsaturation, does not take part in the thickening mechanism in the dual thickening system of Epel et al. Further, the polyether polyol contemplated for use with the present invention has a molecular weight of approximately 600 to 4,000, a functionality of 2 to 3, and preferably 2, and an NCO/OH ratio, after reaction to form the isocyanate terminated urethane prepolymer of the present invention of 1.2/1 to 5/1, and preferably and NCO/OH ratio between 1.8 and 3. Thus, the present invention differs from O'Connor et al.

DETAILED DESCRIPTION OF PREFERRED EMBODIMENT

The isocyanate terminated urethane prepolymer of the present invention is based upon a polyether or polyester polyol, or a mixture thereof, and preferably a polyether polyol, and a di-isocyanate or polyisocyanate. The polyol is preferably a diol or triol having a molecular weight of approximately 600 to approximately 4,000, and preferably about 2,000, as exemplified by BASF's Pluracol P-2010, and a functionality of approximately 2 to approximately 6, and preferably 2 to 3 and more preferably 2. The dual functional additive of the present invention is formed in a one-step addition reaction between one equivalent weight of the polyol as described above and two equivalent weights of the polyisocyanate in the presence of approximately 0–1% of a conventional urethane catalyst such as stanneous octoate, dibutyltin dilaurate and the like, and the amount of such catalyst is determined according to the total weight of the urethane.

The isocyanate terminated urethane additive thus formed should have an isocyanate to hydroxyl ratio NCO/OH of approximately 1.2/1 to approximately 5/1, and preferably NCO/OH between 1.8 to 3, and most preferably about 2.

The dual functional additive of the present invention is contemplated for use with thermoset polyester resin products to which it is covalently bonded to provide improved dynamic impact qualities such as could not be expected, insofar as is known, with any low shrink additive contained within the prior art. In addition, this additive provides greater "low shrink" predictability than would otherwise be expected from any of the conventional low shrink additives contained within the known prior art. Further, by replacing the organic polyisocyanate of Epel et al with the isocyanate terminated urethane prepolymer of the present invention, the additive acts as a thickener for the thermoset polyester resin to which it is added, rendering the matured paste to have improved molding characteristics.

The isocyanate terminated urethane prepolymer is prepared by first reacting an organic polyisocyanate, and preferably a di-isocyanate with a polyol, using standard procedures to yield an isocyanate terminated prepolymer of controlled molecular weight and having an NCO/OH ratio of approximately 1.2/1 to approximately 5/1, and preferably NCO/OH between 1.8 to 3, and most preferably about 2.

The polyisocyanates used in the formation of the present invention include toluene di-isocyanate, such as the 80:20 or 65:35 isomer mixture of the 2,4- and 2,6 isomeric forms, ethylene di-isocyanate, propylene di-isocyanate, meta and para phenyl di-isocyanates, 4,4'-diphenyl methane di-isocyanate (MDI) or a mixture of MDI and its trifunctional cyclic adduct products containing carbiodiimide linkages, 1,5 napthalene di-isocyanate, para and meta xylene di-isocyanates, alkylene di-isocyanates such as tetra methylene di-isocyanate and hexamethylene di-isocyanate, 2,4- and 2,6 di-isocyanate methylcyclohexane, dicyclohexylmethane di-isocyanate, and polymeric MDI containing an average of from two isocyanate groups per molecule. Other polyisocyanates which may be employed include polyisocyanate of toluene di-isocyanate, polyisocyanate prepolymers of aromatic type, toluene di-isocyanate based adducts, aromatic/aliphatic polyisocyanates and polyfunctional aliphatic isocyanate. The exact polyisocyanate employed is not critical, but di-isocyanates are preferred, and of these, 4,4' diphenyl methane di-isocyanate (MDI) or a mixture of MDI and its trifunctional cyclic adduct products containing carbiodiimide linkages are preferred. It should be noted that differing results in respect to low shrinkage additives will be obtained by the use of different polyisocyanates and it must be emphasized that di-isocyanates are preferred.

The polyol reactant used in the dual functional additive is selected from either a polyester polyol or polyether polyol, preferably polyether polyols and mixtures of two or more such polyether polyol compounds. The polyol reactant, or mixture thereof, used has an average equivalent weight of between 600 to 4000 and a functionality of between 2 and 6, and preferably 2 to 3 and more preferably 2.

Among suitable polyether polyols, it is contemplated that polyoxyalkylene polyols and mixtures thereof may be used. These can be prepared according to well known methods, by condensing an alkylene oxide, or mixture of alkylene oxides using random or stepwise addition, with a polyhydric initiator or a mixture of polyhydric initiators.

The alkylene oxides contemplated for use include ethylene oxides, propylene oxide, butylene oxides, amylene oxide, aralkylene oxides, such as trichlorobutylene oxide and such, and the most preferred alkylene oxide is propylene oxide or a mixture thereof with ethylene oxide using random or stepwise oxyalkylation.

Polyhydric initiators used in preparing the polyether polyol reactant include (a) aliphatic diols such as ethylene glycol, 1,3-propylene glycol, 1,2-propylene glycol, butylene glycols, butane diols, pentane diols and the like, (b) the aliphatic triols such as glycerol, trimethylolpropane, triethylolpropane, trimethylolhexane and the like, (c) the polyamines such as tetraethylene diamine and (d) the alkanolamines such as diethanolamine, triethanolamine, and the like. Preferably, the polyhydric initiators of choice for use in preparing the polyether polyol reactant is an aliphatic diol or triol such as ethylene glycol, propylene glycol, glycerol, trimethylolpropane, and the like.

If a polyester polyol is selected for use as the polyol reactant of the dual functional additive of the present invention, such a polyol is usually formed by reacting a polycarboxilic acid with a polyhydric initiator, such as a diol or triol. The polycarboxylic acids include oxalic, malonic, succinic, glutaric, adipic, pimelic, subelric, azelaic acid, and the like. Illustrative polyhydric alcohols include various diols and triols and higher functionality alcohols such as ethylene glycol, 1,3-propylene glycol, 1,2-propylene glycol, butylene glycols, butane diols, pentane diols, glycerol, trimethylolpropane, trimethylolhexane, hexane 1,2,6-triol and the like.

When a polyether polyol reactant is to be created by the alkylene oxide polyhydric initiator reaction, usually a catalyst such as KOH, as is well known in the prior art, is added to speed up the reaction. The resulting polyether polyol should have an average molecular weight of approximately 600 to 4,000. After reaction, the catalyst is preferably removed, leaving a polyether polyol suitable for reaction with the polyisocyanate reactants as discussed above to form the isocyanate terminated urethane prepolymer of the present invention.

In forming the isocyanate terminated urethane prepolymer which comprises the present invention, one equivalent weight of the polyol reactant as defined above is reacted with 1.2 to 5, and preferably two equivalent weights of a polyisocyanate as defined previously in the presence of any conventional urethane catalysts such as stannous octoate and dibutyltin dilaurate and the like, whereby the isocyanate groups are placed on the terminal ends of the prepolymer, thereby yielding the isocyanate terminated urethane prepolymer of the present invention. It should be noted that the prepolymer may be made in the presence of an ethylinically unsaturated monomer, such as styrene, or that a monomer may be added to it after it has been made without adversely affecting its function as a low profile additive to impart the advantages described herein.

The isocyanate terminated urethane prepolymer additive of the present invention may or may not be used with any of the conventional low shrink additives of the prior art, such as polyvinyl acetate and polymethyl methacrylate or a mixture thereof, or any other linear oligomer having a molecular weight within the range of approximately 10,000 to approximately 90,000.

Moreover, regardless of whether or not the prepolymer of the present invention is used with a conventional low shrink additive, the ratio of the total amount of prepolymer to polyester resin should optimally be within the range of approximately 10 parts by weight of prepolymer to 90 parts by weight of polyester resin, to approximately 60 parts by weight of prepolymer to 40 parts by weight of polyester resin.

The SMC contemplated for use with the present invention is comprised essentially of the following ingredients: (a) an unsaturated polyester resin having (1) a ratio of hydroxyl groups to carboxyl groups of between 5.7 and 8.2, and (2) an acid number of at least 14, and (3) an average molecular weight between about 800 and 5,000; (b) a dual thickening system comprised of the isocyanate terminated urethane prepolymer of the present invention in an amount sufficient to react with at least 10 percent, but not more than 105 percent of the hydroxyl groups present, and a metallic oxide or hydroxide selected from Group IIA of the periodic table and consisting of calcium and magnesium oxides or hydroxides in an amount to react with at least 30 percent, but not more than 75 percent of the carboxyl groups present; (c) an ethylinically unsaturated monomer and a free radical polymerization catalyst; (d) an inert filler; (e) fiberous reinforcing material; and (f) a mold release agent.

When used in an SMC as defined above, the isocyanate terminated urethane prepolymer additive of the present invention, the prepolymer may be dissolved in styrene and then used like any other low shrink additive, and is employed in an amount sufficient to react with at least 10 percent but not more than 105 percent of the hydroxyl groups present in the reaction.

The metallic oxide or hydroxide used in the dual thickening system is essentially a metal oxide or hydroxide from the Group IIA on the periodic table and comprises calcium or magnesium. Although calcium may be used in its various oxides and hydroxides, the magnesium is preferred inasmuch as superior results are achieved by the use of magnesium. Although the present invention may be used alone, it may also be used with a monomer from the group styrene, vinyl toluene and vinyl acetate and any other ethylinically unsaturated momoner and when so used, is ordinarily present in an amount to give 0.5 to 2.5 moles of monomer unsaturation per mole of unsaturation in the unsaturated polyester resin. Styrene and vinyl toluene are preferred monomers, although others may be used.

A free radical polymerization catalyst is also employed in the present invention. The catalyst is preferably present in an amount of 0.1 part per 100 parts of total resin and monomer, the parts being measured by weight. The free radical polymerization catalyst is added to the uncured composition so that upon heating to the activation temperature, the additive type crosslinking polymerization reaction will commence between the polymerizable monomer and the unsaturated polyester resin to form the matrix previously described. The catalyst is usually employed in an amount in the range of about 0.1 to 3.0 parts per 100 parts of the total monomer and resin and is usually a peroxide.

The mold release agent contemplated in the present invention may be any of those used in the prior art, such as zinc stearate, calcium stearate, magnesium stearate, organic phosphate esters and other organic liquid internal mold release agents.

The reinforcing fibers are usually present in an amount of about 10 to 70 weight percent for sheet molding compositions and is preferably fiberglass. The preferred range for this reinforcing fiber is approximately 15 to 70 weight percent for use in thermoset polyester resin applications, such as an SMC.

Any number of nonreinforcing fillers may be added to the composition to reduce overall material costs without sacrificing a significant degree of the desirable physical properties in the final product, or may be added to impart specific properties to the uncured compound. Any number of fillers may be used in an amount ranging from about 20 parts to 1000 parts by weight per 100 parts of the pure polyester resin in thermoset polyester resin applications, such as an SMC.

In addition, the invention may, as previously stated, include a low shrink additive polymer, which is ordinarly dissolved in the same type of ethylinically unsaturated monomer in which the polyester resin is dissolved.

In use of the dual functional additive of the present invention with thermoset polyester resin products as defined in Epel et al, and especially sheet molding compositions (SMC), the unsaturated polyester resin as described in Epel et al is dissolved in a monomer such as styrene, vinyl acetate or vinyl toluene. The dual thickening system of Epel et al is modified by the replacement of the organic polyisocyanate defined therein with the dual functional additive of the present invention. A free radical catalyst, which is activated by heat such as organoperoxides, hydroperoxides or azo compounds, and usually a peroxide, is added to the polyester resin material. Inert fillers may be added to reduce the overall cost of the SMC while not appreciably sacrificing the essential properties of the SMC. The modified dual thickening system is then added to the polyester resin, along with an additional amount of the isocyanate terminated urethane prepolymer of the present invention in an amount such that the total amount of prepolymer to polyester resin is within the range of approximately 10 part by weight of prepolymer to 90 parts by weight of polyester resin material to approximately 60 parts by weight of prepolymer to 40 parts by weight of polyester resin.

Reinforcing fibers, such as fiberglass, are added to the SMC in a conventional manner. Once the fibers have been thoroughly admixed with the composition, the SMC is B-staged to a moldable consistency by aging at 90° to 104° F. for 3 to 5 days. After the material has been B-staged, it can be molded at 280° to 315° F. in 1 to 2 minutes, depending on the specific configuration, i.e. thickness, of the part being molded. After B-staging has occurred, the SMC may be stored for long periods of time without jeopardizing either its handleability or processability.

Finally, by virtue of being covalently bonded to the polyester resin matrix of the SMC, the new additive imparts superior temperature retention properties to the SMC infrastructure which are not achievable, insofar as is known, with any of the known prior art.

The use of the dual functional additive of the present invention in the manner described above creates an SMC which exhibits superior viscosity index, as well as improved dynamic impact properties, high temperature retention properties, and pigmentability over any in the known prior art.

The following examples are given by way of reference only, and are not intended in any way to be a limitation on the scope or spirit of the present invention.

EXAMPLES 1 THROUGH 6

Examples 1 through 6 are given to show the method for preparing the prepolymer contemplated by the present invention from either a polyether or a polyester base.

The polyol, either a polyether polyol or a polyester polyol, is dissolved in styrene until a clear, homogenous solution is obtained. The isocyanate is in a reaction kettle and the polyol solution is added to it at the rate of approximately 1.67 percent by weight per minute. During the addition of the polyol, the reactants are maintained at a temperature of approximately 100° F.

After the addition of the polyol, a catalyst is added to the reaction mass and the reactants are allowed to exotherm for approximately 30 minutes. After the reaction temperature stabilizes, usually within 30 minutes of exotherm, the composition is heated to approximately 155° F. and maintained at that temperature for an additional 30 minutes. The completion of the reaction is monitored by measuring the free isocyanate content of the reaction product.

The following examples are given to show the prepolymer formed when using either a polyether polyol or a polyester polyol:

Example 1: Prepolymer;

$$\frac{NCO}{OH} = \frac{2}{1}$$

Polyether polyol; EW = 1000
MDI
75% solids, 25% styrene

Example 2: Prepolymer;

$$\frac{NCO}{OH} = \frac{2}{1}$$

Polyester polyol; EW = 1000
MDI
75% solids, 25% styrene

Example 3: Prepolymer $$\frac{NCO}{OH} = \frac{5}{1}$$

Polyether polyol; EW = 1000
MDI
75% solids, 25% styrene

Example 4: Prepolymer $$\frac{NCO}{OH} = \frac{1.5}{1}$$

Polyether polyol; EW = 1000
MDI
35% solids, 65% styrene

Example 5: Prepolymer $$\frac{NCO}{OH} = \frac{1.5}{1}$$

Polyester polyol; EW = 1000
35% solids, 65% styrene

Example 6: Prepolymer $$\frac{NCO}{OH} = \frac{2}{1}$$

Polyether polyol; EW = 500
MDI
75% solids, 25% styrene

EXAMPLES 7 THROUGH 9

Examples 7 through 9 are provided to show the improvements in shrinkage and moldability which are obtained using the prepolymer blend of the present invention. Example 7, containing no prepolymer and no isocyanate, serves as the control, whereas Example 8 depicts the results when using a polyether based isocyanate terminated urethane prepolymer, and Example 9 serves to depict the results expected when using an isocyanate terminated urethane prepolymer based on a polyester polyol. The advantages expected when using a prepolymer according to the present invention include improved shrinkage properties as well as moldability over the control "paste" blend. In each of the cited examples, the $\Sigma$ value is defined as $$\Sigma = \frac{\eta_{80°\,C.}}{\eta_{30°\,C.}} + \frac{\eta_{90°\,C.}}{\eta_{30°\,C.}} + \frac{\eta_{100°\,C.}}{\eta_{30°\,C.}},$$

where $\eta_{T°C.}$ is the viscosity of the paste at T°C.

| Example 7: | |
|---|---|
| Polyester resin | 67 |
| Acrylic syrup | 33 |
| Urethane prepolymer | — |
| Styrene | — |
| Free radical catalyst | 1 |
| Mold release agent | 3 |
| Magnesium oxide | — |
| Magnesium hydroxide | 1 |
| Calcium Carbonate | 200 |
| NCO/OH | 0 |
| Initial viscosity at 100° F. | 29000 cps |
| B-staged viscosity at R.T. | $20 \times 10^6$ cps |
| Shrinkage, inch/inch | $3.6 \times 10^{-3}$ |
| Expansion inch/inch | — |
| Molding characteristics: | |
| $\Sigma$ value | 0.065 |
| Viscosity number | 350 |
| Example 8: | |
| Polyester resin | 67 |
| Acrylic syrup | 16.5 |
| Urethane prepolymer (Ex. 1) | 7.7 |
| Styrene | 8.8 |
| Free radical catalyst | 1 |
| Mold release agent | 3 |
| Magnesium oxide | — |
| Magnesium hydroxide | 1 |
| Calcium carbonate | 200 |
| NCO/OH | 0.223 |
| Initial viscosity of 100° F. | 36800 cps |
| B-staged viscosity at R.T. | $29 \times 10^6$ cps |
| Shrinkage, inch/inch | $3.5 \times 10^{-3}$ |
| Expansion inch/inch | — |
| Molding characteristics: | |
| $\Sigma$ value | 0.133 |
| Viscosity number | 150 |

-continued

| Example 9: | |
|---|---|
| Polyester resin | 67 |
| Acrylic syrup | 16.5 |
| Urethane prepolymer (Ex. 2) | 7.7 |
| Styrene | — |
| Free radical catalyst | 1 |
| Mold release agent | 3 |
| Magnesium oxide | — |
| Magnesium hydroxide | 1 |
| Calcium carbonate | 200 |
| NCO/OH | 0.223 |
| Initial viscosity at 100° F. | 20000 cps |
| B-staged viscosity at R.T. | $26 \times 10^6$ cps |
| Shrinkage, inch/inch | $8.8 \times 10^{-3}$ |
| Expansion inch/inch | — |
| Molding characteristic: | |
| Σvalue | 0.159 |
| Viscosity number | 107 |

EXAMPLES 10 THROUGH 13

Examples 10 through 13 are provided to depict the effect various specific ratios of isocyanate to hydroxyl groups in polyester and/or polyester resin systems as it relates to shrinkage characteristics and moldability. Example 10 acts as the control, having no isocyanate terminated urethane prepolymer present and a polyester resin and a polymethyl methacrylate and styrene and having similar properties as Example 7, namely poor moldability.

Example 11 depicts the effects of the isocyanate terminated urethane prepolymer product of Example 3 having a styrene blend and an NCO/OH ratio of 5:1 on a polyester resin product. The prepolymer according to Example 11 shows a slightly higher shrinkage than the control of Example 10, but still within normally acceptable parameters. Further, Example 11 depicts an improved moldability relative to the control of Example 10.

Example 12 depicts the effect of an isocyanate terminated urethane prepolymer based on a polyether polyol formed from a styrene blend having an NCO/OH ratio of 1.5/1. The example is provided to show the effect of different ratios of NCO/OH relative to shrinkage and moldability, which in this example are much improved over the control of Example 10.

Example 13 is provided to show the results to be expected relative to shrinkage and moldability when using an isocyanate terminated urethane prepolymer based on a polyester polyol in a styrene blend which forms the polyester resin of the Example. As seen in Example 13, an NCO/OH of 1.5/1 is used in the polyester based prepolymer resulting in a higher shrinkage than the control of Example 10, but still within normally acceptable parameters, as well as improved moldability over that exhibited by the control of Example 10.

| Example 10: | |
|---|---|
| Polyester resin | 70 |
| Acrylic syrup | 30 |
| Urethane prepolymer | — |
| Styrene | — |
| Free radical catalyst | 1 |
| Mold release agent | |
| Magnesium oxide | 0.6 |
| Magnesium hydroxide | — |
| Calcium carbonate | 200 |
| NCO/OH | 0 |
| Initial viscosity at 100° F. | 28000 cps |
| B-staged viscosity at R.T. | $20 \times 10^6$ cps |
| Shrinkage, inch/inch | $4 \times 10^{-6}$ |
| Expansion inch/inch | — |
| Molding characteristics: | |
| Σvalue | 0.067 |
| Viscosity number | 335 |
| Example 11: | |
| Polyester resin | 70 |
| Acrylic syrup | — |
| Urethane prepolymer (Ex. 3) | 13.5 |
| Styrene | 16 |
| Free radical catalyst | 1 |
| Mold release agent | 3 |
| Magnesium oxide | 0.6 |
| Magnesium hydroxide | — |
| Calcium carbonate | 200 |
| NCO/OH | 0.761 |
| Initial viscosity at 100° F. | 34000 cps |
| B-staged viscosity at R.T. | $40 \times 10^6$ cps |
| Shrinkage, inch/inch | $6.0 \times 10^{-3}$ |
| Expansion inch/inch | — |
| Molding characteristics: | |
| Σvalue | 0.229 |
| Viscosity number | 58.3 |
| Example 12: | |
| Polyester resin | 70 |
| Acrylic syrup | — |
| Urethane prepolymer (Ex. 4) | 30 |
| Styrene | — |
| Free radical catalyst | 1 |
| Mold release agent | 3 |
| Magnesium oxide | 0.6 |
| Magnesium hydroxide | — |
| Calcium carbonate | 200 |
| NCO/OH | 0.134 |
| Initial viscosity at 100° F. | 104000 cps |
| B-staged viscosity at R.T. | $65 \times 10^6$ cps |
| Shrinkage, inch/inch | $2.1 \times 10^{-3}$ |
| Expansion inch/inch | — |
| Molding characteristic: | |
| Σvalue | 0.226 |
| Viscosity number | 45.3 |
| Example 13: | |
| Polyester resin | 70 |
| Acrylic syrup | — |
| Urethane prepolymer (Ex. 5) | 30 |
| Styrene | |
| Free radical catalyst | 1 |
| Mold release agent | 3 |
| Magnesium oxide | 0.6 |
| Magnesium hydroxide | — |
| Calcium carbonate | 200 |
| NCO/OH | 0.134 |
| Initial viscosity at 100° F. | 31200 cps |
| B-staged viscosity at R.T. | $60 \times 10^6$ cps |
| Shrinkage, inch/inch | $7.8 \times 10^{-3}$ |
| Expansion inch/inch | — |
| Molding characteristic: | |
| Σvalue | 0.571 |
| Viscosity number | 11.1 |

EXAMPLES 14 AND 15

Examples 14 and 15 are provided to depict the shrinkage characteristics of the prepolymer of the present invention contrasting the shrinkages observed when using a polyether polyol having the equivalent weight (E.W.) of 1000 and 500. In both examples, the NCO/OH is 2/1, which is within the preferred ranges of the present invention.

| Example 14: | |
|---|---|
| Polyester resin | 50 |
| Acrylic syrup | 27.8 |
| Urethane prepolymer (Ex. 1) | 11.75 |
| Styrene | 8.4 |

| -continued | |
|---|---|
| Polyether polyol | 2.9 |
| Free radical catalyst | 1 |
| Mold release agent | 3 |
| Magnesium oxide | — |
| Magnesium hydroxide | 2 |
| Calcium carbonate | 219 |
| NCO/OH | 0.272 |
| Initial viscosity at 100° F. | 56000 cps |
| B-staged viscosity at R.T. | $30 \times 10^6$ cps |
| Shrinkage, inch/inch | — |
| Expansion inch/inch | $2.5 \times 10^{-3}$ |
| Example 15: | |
| Polyester resin | 50 |
| Acrylic syrup | 27.8 |
| Urethane prepolymer (Ex. 6) | 11.75 |
| Styrene | 8.4 |
| Polyether polyol | 2.9 |
| Free radical catalyst | 1 |
| Mold release agent | 3 |
| Magnesium oxide | — |
| Magnesium hydroxide | 2 |
| Calcium carbonate | 219 |
| NCO/OH | 0.466 |
| Initial viscosity at 100° F. | 51200 cps |
| B-staged viscosity at R.T. | $51 \times 10^6$ cps |
| Shrinkage, inch/inch | $0.4 \times 10^{-3}$ |
| Expansion inch/inch | — |

EXAMPLES 16 AND 17

Examples 16 and 17 are provided to contrast the dynamic impact characteristics of conventional prior art SMCs with the SMC formed by the present invention.

| Example 16: | |
|---|---|
| Polyester resin | 57 |
| Acrylic syrup | 43 |
| Urethane prepolymer | — |
| Styrene | — |
| Free radical catalyst | 1 |
| Mold release agent | 3 |
| Magnesium oxide | — |
| Magnesium hydroxide | 2 |
| Calcium carbonate | 190 |
| 1" cut glass raving | 115 |
| Flexural strength, (ASTM D-790-70) | 26000 psi |
| Flexural modulus, (ASTM D-790-70) | $1.7 \times 10^6$ psi |
| Tensile strength, (ASTM D-683-68) | 10500 psi |
| Dynamic impact strength, at initial fracture at 6 mph, 0.120" thickness at 75° F.: | |
| Energy absorbed | 5.0 ft lbs. |
| Maximum load | 550 lbs. |
| Example 17: | |
| Polyester resin | 57 |
| Acrylic syrup | 25.1 |
| Urethane prepolymer (Ex. 1) | 11.6 |
| Styrene | 6.3 |
| Free radical catalyst | 1 |
| Mold release agent | 3 |
| Magnesium oxide | — |
| Magnesium hydroxide | 2 |
| Calcium carbonate | 190 |
| 1" cut glass raving | 115 |
| Flexural strength, (ASTM D-790-70) | 26000 psi |
| Flexural modulus, (ASTM D-790-70) | $1.75 \times 10^6$ psi |

| -continued | |
|---|---|
| Tensile strength, (ASTM D-683-68) | 10500 psi |
| Dynamic impact strength, at initial fracture at 6 mph, 0.120" thickness at 75° F.: | |
| Energy absorbed | 7.8 ft lbs. |
| Maximum load | 800 lbs. |

It will be readily understood that various modifications may be made by those learned in the art without departing from the scope or spirit of the present invention.

What is claimed is:

1. In a maturated moldable sheet molding compound suitable for molding under pressure, said molding compound having fillers and reinforcing materials dispersed in a thermosetting resin composition said resin being comprised primarily of an unsaturated polyester resin said resin including an aliphatically unsaturated monomer, a free radical polymerization catalyst and an internal mold release agent, said resin composition further containing a dual thickening system for modifying the viscosity of the resin composition, said dual thickening system comprising an oxide or hydroxide of magnesium or calcium and a polyisocyanate; the improvement comprising: using as the polyisocyanate an isocyanate terminated prepolymer having an NCO to OH ratio of from about 1.2/1 to 5/1 said isocyanate terminated prepolymer being the reaction product of one equivalent of a polyol having an average molecular weight of about 600 to 4000 and an average functionality between 2 and 6 with from 1.1 to 5 equivalent weights of a polyisocyanate selected from the group consisting of toluene diisocyanate, ethylene diisocyanate, phenyl diisocyanate, 4,4'-dipenyl methane diisocyanate (MDI), a mixture of 4,4'-diphenyl isocyanate and its trifunctional cyclic adduct container carbondiimide linkages, 1,5-naphtalene diisocyanate, xylene diisocyanate, tetramethylene diisocyanate, and hexamethylene diisocyanate; whereby sheet molding compounds containing the improved dual thickening system have improved shrink characteristics and better viscosity index properties enhancing the moldability of the resin and quality of the products made using the improved resin.

2. The molding compound of claim 1 where the isocyanate terminated prepolymer, has an NCO to OH ratio of 1.8 to 3.

3. The molding compound of claim 1 where the isocyanate terminated prepolymer is present in an amount sufficient to react with at least 10% but no more than 1–5% of the terminal hydroxy groups in the polyester resin.

4. The compound of claim 1 where the catalyst is stannous octoate.

5. The molding compound of claim 1 where the aliphatically unsaturated monomer is chosen from the class of styrene, vinyl acetate and vinyl toluene.

6. The compound of claim 1 where the compound contains a low shrink additive chosen from the class consisting polymethyl methacrylate, and polyvinyl acetate.

* * * * *